Dec. 12, 1967     R. B. ADAMS     3,357,441

FLUID CONTROL APPARATUS

Filed Oct. 5, 1964

INVENTOR
ROBERT B. ADAMS

BY

ATTORNEY

United States Patent Office 3,357,441
Patented Dec. 12, 1967

3,357,441
FLUID CONTROL APPARATUS
Robert B. Adams, Bethayres, Pa., assignor to Moore Products Co., Spring House, Pa., a corporation of Pennsylvania
Filed Oct. 5, 1964, Ser. No. 401,523
9 Claims. (Cl. 137—81.5)

ABSTRACT OF THE DISCLOSURE

Fluid flow control apparatus having a nozzle supplying fluid into an interaction chamber which chamber is provided with control passageways to determine the direction of discharge from the chamber and in which solenoid valves in said passageways are subject to selective control and to control responsive to differential pressure therein to attain or restore a previously selected direction of flow.

---

This invention relates to fluid control apparatus.

Fluid flow control devices or diverting valves have heretofore been proposed with no moving parts in the valve, the fluid stream being directed as a jet into a fluid interaction or reaction chamber and the direction of the jet being determined by the pressure conditions prevailing at the sides of the jet.

Pressure pulses have also heretofore been employed to position the jet which would thereafter be locked into its new position so long as the nozzle stream continued to flow. The disadvantages of such pulse control system was that in the event of temporary interruption of the main stream upon resumption the stream might not be directed as it was before the interruption.

It is the principal object of the present invention to provide fluid control apparatus employing a diverting valve with one or more normally closed control ports and control apparatus for such ports to provide a control impulse thereto and in which, after a temporary interruption, a previously selected direction of flow will be resumed or restored.

It is a further object of the present invention to provide impulse control apparatus for a fluid diverting valve which automatically controls the impulses to attain or restore a previously selected direction of flow upon starting up.

It is a further object of the present invention to provide control apparatus of the character aforesaid in which electric switching devices are advantageously employed.

It is a further object of the present invention to provide fluid control apparatus which is particularly suited to the handling of slurries, suspensions and the like, and which will resume flow in a previously selected direction.

It is a further object of the present invention to provide fluid flow control apparatus as aforesaid in which freedom from contamination of the fluid being handled is effected.

Other objects and advantageous features of the invention will be apparent from the description and claims.

Figure 1:
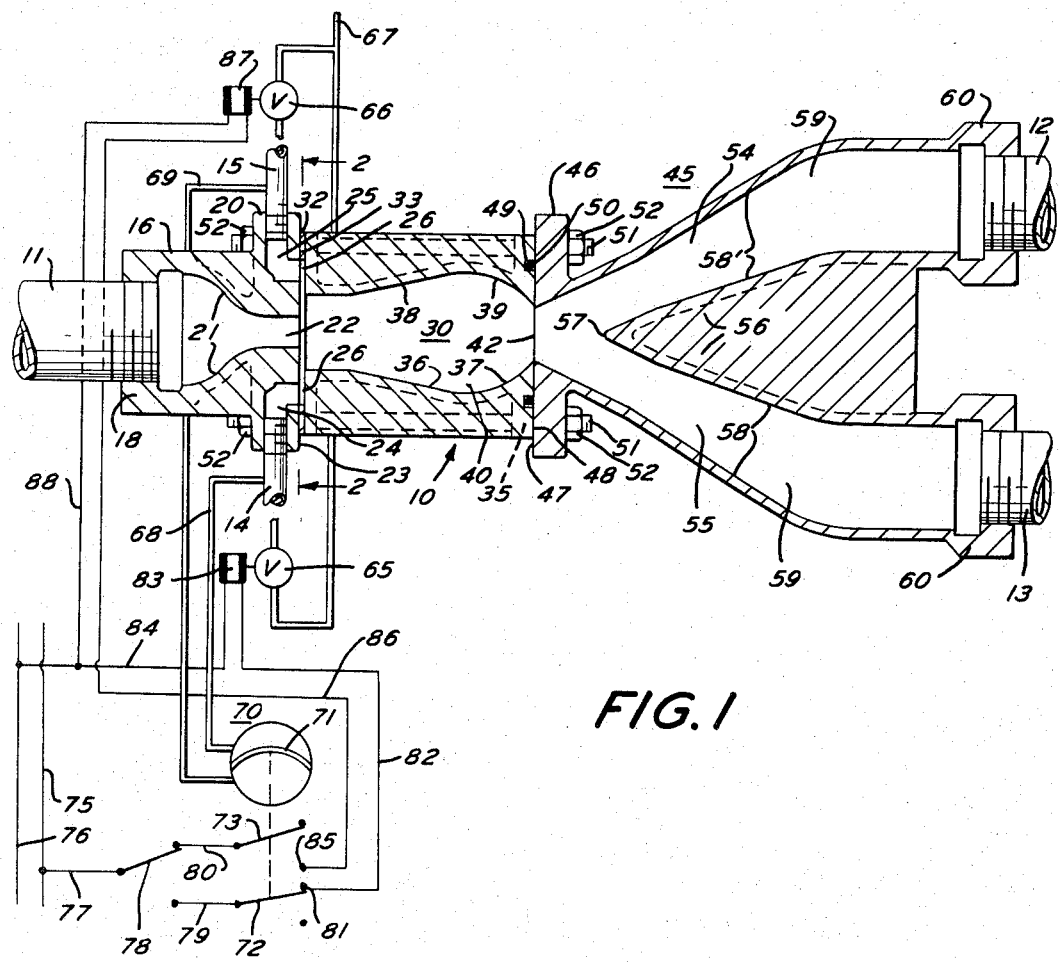
Figure 2:
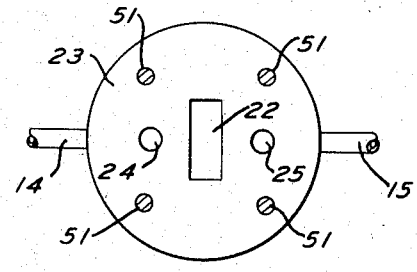

The nature and characteristic features of the invention will be more readily understood from the following description, taken in connection with the accompanying drawings forming part thereof in which:

FIGURE 1 is a view of fluid control apparatus in accordance with the invention, parts being shown in horizontal longitudinal section and parts being shown diagrammatically; and FIG. 2 is a transverse vertical sectional view taken approximately on the line 2—2 of FIG. 1.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to FIGS. 1 and 2 of the drawings, in the embodiment of the invention therein illustrated and in which parts are shown diagrammatically, a diverter valve 10 is shown having an inlet pipe 11 for the supply of fluid under pressure, which is to be delivered either to the pipe 12 or to the pipe 13, and having pipes 14 and 15 for control fluid.

The inlet pipe 11 is connected, in any desired manner, to an inlet section 16. The inlet pipe 11 is preferably of sufficient length to minimize disturbances caused by upstream elements, such as valves or fittings (not shown).

The inlet section 16 serves as a transition region for changing from the circular cross section of fluid flow in the inlet pipe 11 to a rectangular cross section with a minimum of turbulence.

The inlet section 16 preferably includes an inlet portion 18 and an end flange 20 with transition walls 21 therebetween. The walls 21 change in interior shape from circular in cross section at the inlet portion 18 to rectangular in cross section at a nozzle 22 which terminates at the end face 23 of the flange 20. The nozzle 22 is of lesser dimension or narrower from side to side than it is from top to bottom to facilitate the bending or sidewise diversion of the jet issuing therefrom.

The flange 20 has fluid connections 24 and 25 at each side thereof to which the pipes 14 and 15 are respectively connected. The fluid connections 24 and 25 extend to the face 23 of the flange 20 and to passageways 26 for determining the pressure conditions at both sides of the nozzle 22, as hereinafter explained.

A fluid interaction chamber 30 is provided having a face 32 for disposition in meeting relation to the face 23 of the flange 20. A fluid tight gasket 33 is preferably interposed between the faces 23 and 32 for preventing fluid leakage at this location. The gasket 33 is preferably relieved to provide the fluid passageways 26. The fluid interaction chamber 30 has a mounting flange 35 at its opposite end and intermediate the ends is preferably substantially rectangular in cross section, having opposite diverging and converging wall portions 36 and 37 on one side and diverging and converging wall portions 38 and 39 on the other side.

The top and bottom walls 40 of the chamber 30 are preferably flat to provide the rectangular shape from end to end of the chamber 30. The fluid interaction chamber 30 has a discharge opening 42.

The shape of the chamber 30, and particularly the wall portions 36 and 37 on one side and 38 and 39 on the other, is such that the boundary layer effect of pure fluid interaction devices is utilized with the fluid jet from the nozzle 22 directed to and maintained along one or the other side, as hereinafter pointed out.

A fluid delivery section 45 is provided in series relation to the chamber 30 having a flange 46 with a face 47 adapted to be disposed in meeting relation with a face 48 of the flange 35. The flange 35 can have a groove 49 for the reception of a packing 50, such as an O-ring engaging the face 47.

The inlet section 16, the fluid interaction chamber 30 and the delivery section 45 can be held in assembled relation in any desired manner, but preferably by threaded rods 51 having nuts 52 on the ends thereof and engaging the flanges 20 and 46.

The fluid delivery section 45 preferably has a pair of legs 54 and 55 with a common wall 56 connected at an apex or fluid divider 57 which is longitudinally axially aligned with the nozzle 22. The discharge legs 54 and 55 preferably have diverging walls 58 for at least partial pressure head recovery from the kinetic energy of the stream or streams of fluid passing therealong.

The legs 54 and 55 may be provided with transition sections 59 terminating in outlet connections 60 for standard piping and for connection of the pipes 12 and 13.

The pipes 14 and 15 preferably have solenoid controlled valves 65 and 66 therein and the pipes 14 and 15 are preferably connected to a common pipe 67 from a source of fluid under pressure.

The pipes 14 and 15 preferably also have pressure taps 68 and 69 connected therefrom to a differential pressure responsive switch 70 having a pressure responsive diaphragm 71 for controlling contact arms 72 and 73.

A source of electrical energy is connected to conductors 75 and 76. The conductor 75 is connected by a conductor 77 to a contact arm 78 which is positioned in any desired manner such as manually or by liquid level. The contact arm 78, dependent on its setting, controls the energization of the contact arms 72 and 73 through the conductors 79 and 80.

The contact arm 72 has a contact 81 connected by a conductor 82 to one terminal of the winding 83 of the solenoid valve 65. A conductor 84 connects the other terminal of the winding 83 to the conductor 76.

The contact arm 73 has a contact 85 connected by a conductor 86 to one terminal of the winding 87 of the solenoid valve 66. A conductor 88 connects the other terminal of the winding 87 to the conductor 76.

The mode of operation will now be pointed out.

Liquid under pressure is supplied through the inlet pipe 11 and passes through the inlet section 16 wherein the shape of the fluid stream is changed from circular in cross section to rectangular in cross section and discharged through the nozzle 22 as a jet, rectangular in cross section, into the fluid interaction chamber 30. The initial direction of the jet is along an axis determined by the shape and orientation of the nozzzle 22 and the associated inlet section 16.

As the jet from the nozzle 22 proceeds through the interaction chamber 30, it tends to entrain fluid on each side thereof, thereby reducing the pressure in the side regions between the jet and the walls 36 and 38, respectively.

The region between the jet and the side wall 36 is in communication through one of the passageways 26 with the connection 24 and the region between the jet and the side wall 38 is in communication through the other of the passageways 26 with the connection 25.

Assuming that the jet from the nozzle 22 is locked to wall 36, 37 the pressure conditions at the diaphragm 71 will be such that the contact arm 72 engages the contact 81, and assuming the switch arm 78 to be positioned to energize the conductor 80, neither solenoid 83 nor solenoid 87 will be energized, and both the valves 65 and 66 will be closed, so that the flow from the nozzle 22 will continue to flow along the wall 36, 37 and be directed by the converging wall portion 37 to the passageway in leg 54 for delivery through the pipe 12. So long as the jet remains locked in the position just referred to it will cause the pressure in the pipe 15 to exceed that in pipe 14 thereby holding the diaphragm 71 in the upward position.

If contact arm 78 is moved to the other of its two positions, the conductor 79 will be energized and electric current will flow through the contact arm 72, contact 81, conductor 82, winding of solenoid 83, thereby opening solenoid valve 65 so that pressure is applied from pipe 67 through pipe 14, passageway 24 and control opening 26 adjacent wall 36. Under this condition the jet will be separated from wall 36 and directed toward wall 38 where it will lock onto that wall and be directed by the wall 39 to the passageway in the leg 55 for delivery to the pipe 13, and so long as the jet remains locked to the walls 38 and 39 it will provide a differential pressure effective on the diaphragm 71 in a downward direction for moving the contact arms 72 and 73 and terminating the flow of electric current so that solenoid valve 65 closes and shuts off fluid flow through the pipe 14.

In the event that the main fluid flow through the pipe 11 should be temporarily interrupted and then resumed it is possible because of unavoidable random asymmetry or other factors for the jet from nozzle 22 to restart along the wrong side wall of the chamber 30. If this should occur, the pressure conditions at pipes 14 and 15 will be such as to move the diaphragm 71 to the opposite side from that at which it had last been moved. This action will automatically energize one of the solenoids 83 or 87 to open its associated valve 65 or 66 so that pressure from line 67 will be effective to switch the jet to the desired side wall.

It will be seen that the structure and its operation accomplish the objects of the invention.

I claim:

1. Fluid flow control apparatus comprising a source of fluid to be controlled, a nozzle connected to said source for delivery of a fluid stream, a fluid interaction chamber to which said nozzle is connected and from which the fluid is delivered, fluid control passageways on opposite sides of said nozzle for controlling the position of said fluid stream in said chamber, a source of control fluid connected to said control passageways, valve members in each of said control passageways, means for opening said valve members, and means responsive to the differential pressure between said control passageways for selectively deactivating said opening means.

2. Fluid flow control apparatus as defined in claim 1 in which the fluid interaction chamber has opposite side walls and said walls are shaped for fluid lock on.

3. Fluid flow control apparatus as defined in claim 1 in which said valve members have controlling solenoids therefor.

4. Fluid flow control apparatus as defined in claim 3 in which said last means is a differential fluid pressure responsive switch.

5. Fluid flow control apparatus as defined in claim 1 in which said last means is a differential fluid pressure responsive switch.

6. Fluid flow control apparatus as defined in claim 1 in which the means for selectively opening said valve members includes an electric switch.

7. Fluid flow control apparatus as defined in claim 1 in which said fluid interaction chamber has a pair of delivery connections for selective delivery of fluid from said chamber.

8. Fluid flow control apparatus comprising a source of fluid to be controlled, a nozzle connected to said source for delivery of a fluid stream, a fluid interaction chamber to which said nozzle is connected, a pair of fluid delivery passageways communicating with said chamber, fluid control passageways on opposite sides of said nozzle for controlling the position of said fluid stream in said chamber, a source of control fluid connected to said control passageways, valve members in each of said control passageways, solenoid members for opening said valve members, differential fluid pressure, responsive switch means to which said control passageways are connected for deactivating said solenoid members, and switch members for selectively energizing said switch means.

9. Fluid flow control apparatus as defined in claim 1 in which
- said means for opening said valve members comprises electrically operated motor members each having an electric control circuit,
- control means for selectively activating one of said control circuits,
- said means responsive to said differential pressure comprising a differential pressure switch, and said switch has contact elements in series with each of said control circuits.

References Cited

UNITED STATES PATENTS

| | | | |
|---|---|---|---|
| 3,124,999 | 3/1964 | Woodward | 137—81.5 |
| 3,148,691 | 9/1964 | Greenblott | 137—81.5 |
| 3,172,425 | 3/1965 | Cox | 137—624.19 X |
| 3,252,481 | 5/1966 | Meier | 137—81.5 X |

M. CARY NELSON, *Primary Examiner.*

SAMUEL SCOTT, *Examiner.*